United States Patent
Orlamünder

(10) Patent No.: US 6,427,819 B1
(45) Date of Patent: Aug. 6, 2002

(54) CLUTCH FOR A MOTOR VEHICLE

(75) Inventor: Andreas Orlamünder, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/602,486

(22) Filed: Jun. 23, 2000

(30) Foreign Application Priority Data

Jun. 23, 1999 (DE) .......................... 199 28 514

(51) Int. Cl.⁷ .......................... F16D 13/69; F16D 13/56
(52) U.S. Cl. ................. 192/70.17; 192/70.2; 192/70.28
(58) Field of Search .......................... 192/70.17, 70.18, 192/70.19, 70.2, 70.28

(56) References Cited

U.S. PATENT DOCUMENTS

| | | | |
|---|---|---|---|
| 4,081,064 A | * 3/1978 | Smith et al. ............. | 192/70.13 |
| 4,479,569 A | * 10/1984 | Kummer er al. .......... | 192/70.2 |
| 4,540,079 A | 9/1985 | Link | |
| 4,940,124 A | * 7/1990 | Galuska et al. .......... | 192/70.28 |
| 5,358,085 A | 10/1994 | Flotow et al. | |
| 6,035,987 A | * 3/2000 | Fukuda .................... | 192/70.27 |
| 6,279,709 B1 | * 8/2001 | Orlamunder ............. | 192/70.12 |

FOREIGN PATENT DOCUMENTS

| | | | | |
|---|---|---|---|---|
| DE | 34 37 741 | 4/1985 | | |
| DE | 195 17 968 | 11/1995 | | |
| GB | 1 577 360 | 10/1980 | | |
| GB | 2 103 312 A | * 2/1983 | ............. | 192/70.28 |
| JP | 55-60728 A | * 5/1980 | ............. | 192/70.28 |

* cited by examiner

*Primary Examiner*—Richard M. Lorence

(57) ABSTRACT

In a clutch for a motor vehicle, an axially displaceable contact-pressure disk has a number of driver elements guided by a guide and further driver elements which are supported with spring elements in another guide. In the disengaged state of the clutch, the spring elements preload the contact-pressure disk into a central position, in which the guided driver element is remote from a stop. This prevents the driver element from digging into the stop and hence prevents sticking of the contact-pressure disk in the engaged state of the clutch.

12 Claims, 2 Drawing Sheets

CLUTCH FOR A MOTOR VEHICLE

BACKGROUND OF THE INVENTION

1. Field of the Invention

The invention relates to a clutch for a motor vehicle with a friction lining which can be clamped between two disks designed as contact-pressure disks and/or intermediate disks. The clutch is connected in a rotationally fixed manner to a first shaft and is used to produce frictional engagement between the first shaft and a second shaft connected in a rotationally fixed manner to the disks. At least one of the disks has driver elements which enter into an axial guide which has a stop for transmitting a torque to the driver element.

2. Description of the Related Art

A multi-disk dry clutch is known, for example, from DE 195 17 968. As the clutch is engaged, one of the contact-pressure disks moves in the direction of the other contact-pressure disk and preloads friction linings against a plurality of intermediate disks. During this process, the friction linings and the intermediate disks are displaced axially. During disengagement, the axially displaceable contact-pressure disk is relieved of load in the axial direction, with the result that the friction linings are separated from the intermediate disk and the contact-pressure disks. A clutch housing has a multiplicity of grooves to guide the contact-pressure disks and the intermediate disks axially. The contact-pressure disks and the intermediate disks have as a toothed driver element which enters into the grooves of the guide. The friction linings similarly have a driver element which engages in a form-fitting manner in an axial guide of a hub. The stops are each accordingly located on that side of the guide on which the driver elements are supported during power transmission by the clutch.

The disadvantage with the known multi-disk clutch is that the driver elements wear and can dig into the stops. During subsequent disengagement, this leads to the friction linings initially sticking in their position and rubbing against the intermediate disks and the fixed contact-pressure disk.

DE 34 37 741 A1 has disclosed a multi-disk clutch in which the intermediate disks each have spring elements and push away from one another during disengagement. This is intended to prevent adjacent intermediate disks from remaining in a state in which they clamp the friction linings. However, as in DE 195 17 968 A1, the axially movable disks have driver elements which enter into guides. The driver elements can dig into the stops of the guides and stick during disengagement.

The problem addressed by the invention is in configuring a clutch of the type stated at the outset in such a way that it reliably prevents sticking of the axially movable disks in the guides.

SUMMARY OF THE INVENTION

According to the invention, the aforementioned problem is solved by placing a spring element for moving the driver elements into a position remote from the stop.

By virtue of this configuration, the driver element (also referred to as a spring supported guided driver) is moved reliably away from the stop during the disengagement of the clutch, hence preventing it from sliding over the stop. Even if the driver elements dig into the stops in the engaged state due to the clutch torque, the driver element is initially moved perpendicularly away from the stop. The contact-pressure disks and the intermediate disks can then separate from the friction linings. With this configuration, the contact-pressure disks and the intermediate disks do not stick in the guide as the clutch is disengaged. By virtue of the invention, the friction linings can be prevented from rubbing against the contact-pressure disks and/or the intermediate disks. Another advantage of this configuration of the clutch is that the driver element is damped by the force of the spring element as it moves up against the stop during the engagement of the clutch. This allows particularly comfortable operation of the clutch according to the invention.

It is possible to secure the spring element on the clutch housing. However, the clutch according to the invention can be assembled in a particularly simple manner if the spring element is arranged on the driver element. As a result, a constructional unit comprising the spring element and the driver element can be preinstalled first. The prefabricated constructional unit can then be installed in the clutch housing as in the case of the known clutch.

The spring element could, for example, be configured as a tension spring that pulls the driver element away from the stop. However, according to another advantageous development of the invention, the spring element requires a particularly small amount of installation space and can furthermore be installed in a simple manner if the spring element is supported in the guide.

The spring element could, for example, be arranged between each of the driver elements and the stops and be completely compressed during the engagement of the clutch and transmission of a torque. However, in this configuration, the spring element may be plastically deformed and damaged. Damage to the spring element can be avoided in a simple manner if some of the driver elements are designed as protrusions which are narrow in comparison with the guide, and in each case at least one spring element is arranged on these driver elements. By virtue of this configuration, the spring travel of the spring element and an envisaged preload can be easily set.

The spring element could, for example, be configured as a spring tongue. However, according to an advantageous development of the invention, the spring element can preload the driver element over a very large distance if the spring element is of a meandering configuration.

According to another advantageous development of the invention, the components having the driver elements are preloaded reliably into an envisaged initial position if two spring elements with mutually opposite spring directions are arranged on each of the driver elements.

A contributory factor in further simplifying the assembly of the clutch according to the invention is for the driver element to bear a holding clip with a plurality of spring elements.

According to another advantageous development of the invention, the contact-pressure disks and/or the intermediate disks can simply be moved apart by a predetermined amount when disengaging the clutch if some of the spring elements are configured for support against an adjacent contact-pressure disk or intermediate disk. The contact-pressure disks and the intermediate disks are thereby preloaded in the axial and radial directions.

According to another advantageous development of the invention, the spring elements are secured reliably on the driver element if the holding clip has holding tabs provided to engage around the driver element.

According to another advantageous development of the invention, the holding clip and the spring elements can be configured in a particularly economical manner if the holding clip is produced in one piece with the spring elements and/or the holding tabs.

The invention allows for numerous embodiments. To further illustrate its basic principle, one of these is illustrated in the drawings and is described below.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
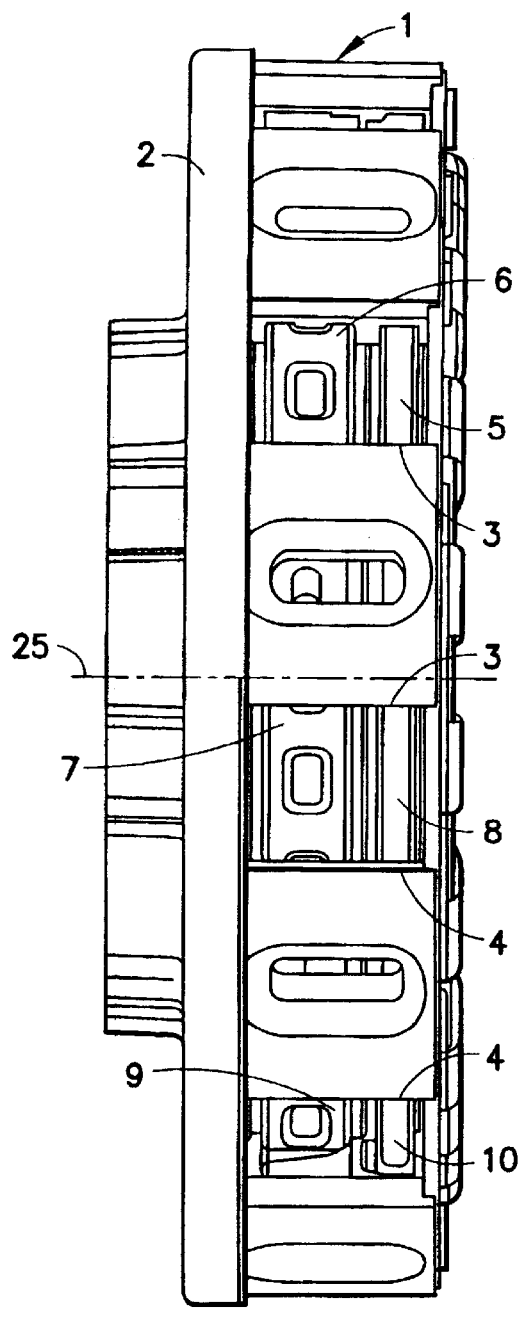
FIG. 1 shows a clutch according to the invention.

FIG. 1 shows a clutch designed as a multi-disk clutch and having a clutch housing 1. The clutch housing 1 has a fixed contact-pressure disk 2 and guides 3, 4 for an axially displaceable contact-pressure disk 5 and for a likewise axially displaceable intermediate disk 6. The guides 3, 4 are of slot-like configuration and accommodate driver elements 7–10 designed as protrusions. Some of the driver elements 7, 8 have approximately the same width as the guides 3, while the other driver elements 9, 10 are of narrower configuration than the guides 4.

Figure 2:
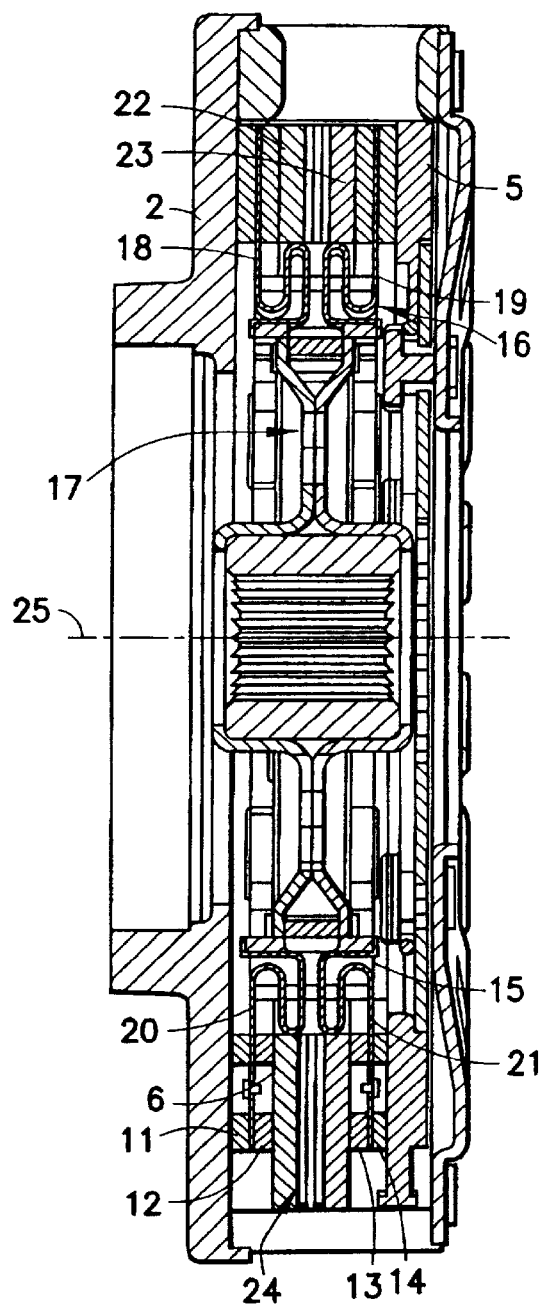
FIG. 2 shows the clutch from FIG. 1 in a longitudinal section.

As FIG. 2 shows, respective friction linings 11–14 are arranged between the contact-pressure disks 2, 5 and the intermediate disk 6. The friction linings 11–14 are secured on elastic lining springs 18–21 arranged in grooves 15, 16 in a hub 17. The axially displaceable contact-pressure disk 5 can be displaced in the direction of the fixed contact-pressure disk 2. During this process, the friction linings 11–14 and the intermediate disk 6 are clamped between the contact-pressure disks 2, 5 and frictional engagement is produced between the clutch housing 1 and the hub 17. This marks the engaged state of the clutch. The lining springs 18–21 are of slightly narrower configuration than the grooves 15, 16 of the hub 17 and, in the disengaged state of the clutch, preload the friction linings 11–14 into an envisaged position remote from the contact-pressure disks 2, 5 and the intermediate disk 6. This prevents the linings springs 18–21 from sliding along the grooves 15, 16 in the hub 17. The intermediate disk 6 has two disk parts 22, 23, one above the other, and apertures 24 for guiding cooling air.

The hub 17 can be secured on a first shaft, while the clutch housing 1 is arranged on a second shaft. To simplify the drawing, all that is shown of the shafts is a common axis of rotation 25.

Figure 3:
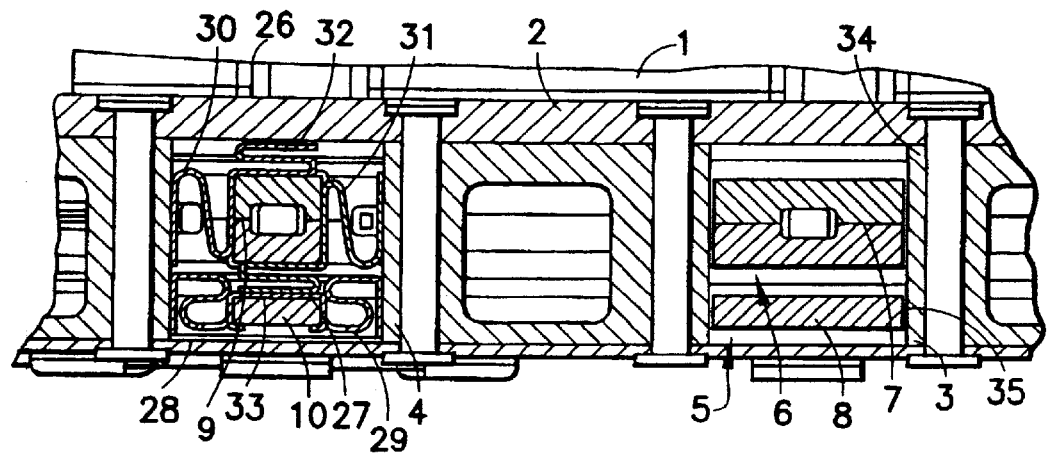
FIG. 3 shows a tangential section through two guides of a clutch housing of the clutch in FIG. 1.

FIG. 3 shows a tangential section through two of the guides 3, 4 of the clutch housing 1 in FIG. 1. One of the driver elements 9, 10 of the intermediate disk 6 and of the axially displaceable contact-pressure disk 5 in each case, bears a holding clip 26, 27 with spring elements 28–31 having a meandering configuration arranged thereon. The driver elements are arranged in the guides 4. The spring elements 28–31 are supported against the wall of the guide 4. The other driver elements 7, 8 are of slightly narrower configuration than their guide 3. During transmission of a torque by the clutch, the driver elements 7, 8 are preloaded against stops 34, 35 designed as edges of the guide 3. In the disengaged state of the clutch, the spring elements 28–31 preload the intermediate disk 6 and the axially displaceable contact-pressure disk 5 into a central position, in which the driver elements 7, 8 are remote from the stops 34, 35. Further spring elements 32, 33, which are supported against the contact-pressure disks 2, 5, are arranged on the intermediate disk 6. These spring elements 32, 33 move the intermediate disk 6 into a central position in the disengaged state of the clutch.

Figures 4, 5:
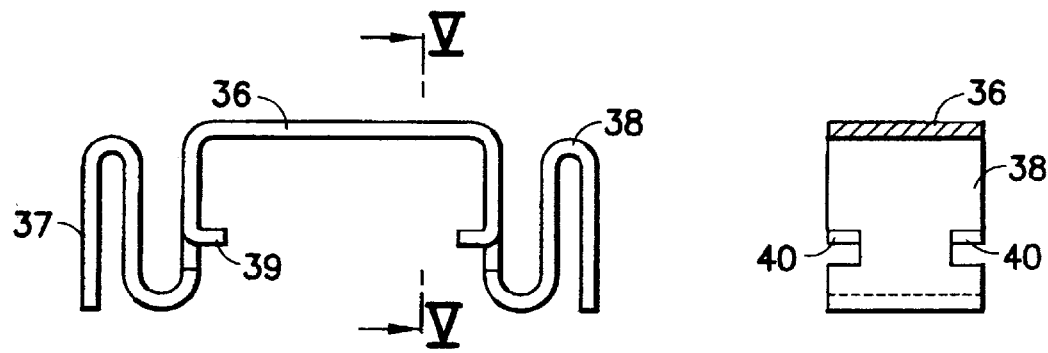
FIG. 4 shows two spring elements arranged on a holding clip.
FIG. 5 shows the holding clip with one of the spring elements in FIG. 4 in a sectional representation along the line V—V.

FIG. 4 shows another embodiment of a holding clip 36 with two spring elements 37, 38 situated opposite one another. This holding clip 36 can be provided to preload the axially displaceable contact-pressure disk 5 in FIGS. 1 and 2. The holding clip 36 has holding tabs 39, 40 to allow it to be secured in a form-fitting manner on the contact-pressure disk 5. FIG. 5 shows, in a section through the holding clip 36 in FIG. 4, that the holding tabs 39, 40 are produced in one piece with the holding clip 36.

Figure 6:
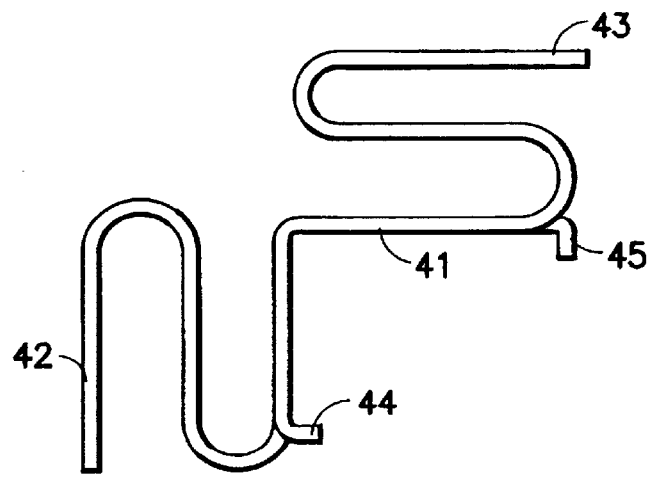
FIG. 6 shows a holding clip for an intermediate disk from FIG. 1 with two spring elements.

FIG. 6 shows another embodiment of a holding clip 41 provided for securing on the intermediate disk 6 illustrated in FIGS. 1 and 2, for example. The holding clip 41 bears two spring elements 42, 43 and holding tabs 44, 45 arranged at right angles to one another. The holding tabs 44, 45 can clamp the disk parts 22, 23 of the intermediate disk 6 illustrated in FIG. 2 together.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A clutch for a motor vehicle, comprising:
   at least one friction lining connectable in a rotationally fixed manner to a first shaft;
   at least two contact pressure disks, whereby said friction lining is fixedly attached between said contact pressure disks, said contact pressure disks are each independently connectable in a rotationally fixed manner to a second shaft;

a first driver element disposed on one of said contact pressure disks;

means for guiding said first driver element in an axial direction, said guiding means including a first axial guide;

a stop on said first axial guide for transmitting a torque to said first driver element; and spring means for moving said first driver element into a position remote from said stop for preventing said first driver element from digging into said stop when said clutch is disengaged, said spring means being arranged on said first driver element.

2. The clutch according to claim 1, whereby said spring means is a spring having a meandering shape.

3. The clutch according to claim 1, whereby said spring means is two spring elements that are arranged in mutually opposite spring directions.

4. The clutch according to claim 1, whereby said spring means is supported in said first axial guide.

5. The clutch according to claim 1, further comprising a predetermined number of first driver elements conformed as protrusions that are narrower than said first axial guide.

6. The clutch according to claim 1, further comprising:

intermediate disks being adjacent to said friction lining and said spring means, whereby said spring means is effective to move said intermediate disks apart by a predetermined amount when said clutch is disengaged to preload said intermediate disks in an axial and circumferential direction.

7. The clutch according to claim 1, wherein a predetermined number of said at least two contact pressure disks has at least one second driver element, and each of said second driver elements enters a second axial guide for guiding said second driver element.

8. The clutch according to claim 1, further comprising:

at least one holding clip being fixedly attached to said spring means for clamping onto said first driver element.

9. The clutch according to claim 8, wherein said at least one holding clip further comprises at least one holding tab for engaging around said first driver element.

10. The clutch according to claim 8, further comprising at least one intermediate disk, whereby each said intermediate disks is independently connectable in a rotationally fixed manner to said second shaft and is adjacent to and supported by said spring means.

11. The clutch according to claim 8, wherein a predetermined number of said at least two contact pressure disks has a second driver element wherein said second driver element enters a second axial for guiding said driver element in an axial direction.

12. The clutch according to claim 10, wherein said spring means and said at least one holding clip are produced in a single piece.

* * * * *